US012452305B2

(12) United States Patent
Gupta et al.

(10) Patent No.: US 12,452,305 B2
(45) Date of Patent: Oct. 21, 2025

(54) ADAPTIVE ENFORCEMENT OF SECURITY WITHIN A NETWORK

(71) Applicant: HEWLETT PACKARD ENTERPRISE DEVELOPMENT LP, Houston, TX (US)

(72) Inventors: Gopal Gupta, Bangalore (IN); Abhinesh Mishra, Bangalore (IN)

(73) Assignee: Hewlett Packard Enterprise Development LP, Spring, TX (US)

(*) Notice: Subject to any disclaimer, the term of this patent is extended or adjusted under 35 U.S.C. 154(b) by 857 days.

(21) Appl. No.: 17/672,262

(22) Filed: Feb. 15, 2022

(65) Prior Publication Data

US 2023/0262093 A1    Aug. 17, 2023

(51) Int. Cl.
*H04L 9/40* (2022.01)
*G06N 20/00* (2019.01)

(52) U.S. Cl.
CPC ............. *H04L 63/20* (2013.01); *G06N 20/00* (2019.01); *H04L 63/0245* (2013.01); *H04L 63/1425* (2013.01); *H04L 63/1433* (2013.01); *H04L 63/1441* (2013.01)

(58) Field of Classification Search
CPC ... H04L 9/0852; H04L 9/0858; H04L 9/0855; H04L 63/061; H04L 9/083; H04L 9/0822; H04L 9/3226; H04L 9/0891; H04L 9/14; H04L 9/0827; H04L 2209/24; H04L 9/08; H04L 9/0819; H04L 9/088; H04L 9/08555; H04L 63/20; H04W 12/041; H04W 12/0431; H04W 12/0433; H04W 12/04; H04W 12/61; H04W 12/63; H04W 12/71; G06F 21/31; G06F 21/44; G06F 7/588; G06F 21/72; G06F 21/86
USPC ............ 726/1, 2, 21, 36; 713/150, 163, 181; 380/255, 264, 276
See application file for complete search history.

(56) References Cited

U.S. PATENT DOCUMENTS

| | | | | |
|---|---|---|---|---|
| 5,764,765 | A * | 6/1998 | Phoenix | H04L 9/0858 380/256 |
| 6,748,083 | B2 * | 6/2004 | Hughes | H04L 9/0858 380/278 |
| 7,178,277 | B2 * | 2/2007 | Takeuchi | H04L 63/062 380/263 |
| 7,437,081 | B2 * | 10/2008 | Mitchell | H04B 10/70 398/154 |
| 8,434,129 | B2 * | 4/2013 | Kannappan | G06Q 10/10 726/22 |
| 8,855,316 | B2 * | 10/2014 | Wiseman | H04L 9/0855 380/278 |
| 9,350,601 | B2 * | 5/2016 | Jain | H04L 69/40 |

(Continued)

*Primary Examiner* — Sharif E Ullah
(74) *Attorney, Agent, or Firm* — Dickinson Wright

(57) ABSTRACT

A system receives one or more ingress data packets from a client device or a user in a network. The system obtains attributes, via packet inspection, from the one or more ingress data packets, and determines one or more embedding vectors from the attributes. The one or more embedding vectors represent a status of a session during which the ingress data packets are obtained. The system transmits the one or more embedding vectors as inputs to a trained machine learning model. The system infers, using the trained machine learning mode, one or more security policies based on the embedding vectors. The system provides or implementing the one or more security policies.

14 Claims, 9 Drawing Sheets

(56) References Cited

U.S. PATENT DOCUMENTS

| | | | |
|---|---|---|---|
| 9,960,465 B2* | 5/2018 | Dudley | H01M 50/204 |
| 10,057,058 B2* | 8/2018 | Murakami | H04L 9/0858 |
| 10,581,604 B2* | 3/2020 | Mustafa | H04L 9/302 |
| 10,771,489 B1* | 9/2020 | Bisht | G06N 20/00 |
| 10,931,588 B1* | 2/2021 | Matthews | H04L 45/66 |
| 10,931,602 B1* | 2/2021 | Matthews | H04L 49/35 |
| 11,057,318 B1* | 7/2021 | Matthews | H04L 49/30 |
| 11,099,902 B1* | 8/2021 | Matthews | G06F 9/5027 |
| 11,121,878 B2* | 9/2021 | McCarty | H04L 9/3213 |
| 11,328,222 B1* | 5/2022 | Matthews | H04L 47/32 |
| 11,892,746 B1* | 2/2024 | Mazed | G02F 1/212 |
| 12,113,675 B1* | 10/2024 | Gupta | H04L 41/082 |
| 2004/0255167 A1* | 12/2004 | Knight | H04L 41/28 |
| | | | 709/224 |
| 2005/0138352 A1* | 6/2005 | Gauvreau | H04L 9/3247 |
| | | | 713/153 |
| 2007/0065154 A1* | 3/2007 | Luo | H04J 14/0282 |
| | | | 398/141 |
| 2007/0076884 A1* | 4/2007 | Wellbrock | H04L 9/0855 |
| | | | 380/263 |
| 2007/0195774 A1* | 8/2007 | Sherman | H04L 69/16 |
| | | | 370/392 |
| 2011/0206204 A1* | 8/2011 | Sychev | H04J 14/06 |
| | | | 380/256 |
| 2011/0213979 A1* | 9/2011 | Wiseman | H04L 9/0844 |
| | | | 713/171 |
| 2014/0010234 A1* | 1/2014 | Patel | H04L 45/74 |
| | | | 370/392 |
| 2014/0068765 A1* | 3/2014 | Choi | H04L 63/1416 |
| | | | 726/23 |
| 2014/0133652 A1* | 5/2014 | Oshida | H04L 9/0897 |
| | | | 380/255 |
| 2015/0047032 A1* | 2/2015 | Hannis | H04L 63/1491 |
| | | | 726/23 |
| 2016/0241396 A1* | 8/2016 | Fu | H04L 9/0836 |
| 2016/0359626 A1* | 12/2016 | Fu | H04L 9/0858 |
| 2016/0366094 A1* | 12/2016 | Mason | H04L 61/5038 |
| 2017/0006082 A1* | 1/2017 | Shishodia | H04L 67/75 |
| 2017/0214525 A1* | 7/2017 | Zhao | H04W 12/0431 |
| 2017/0230173 A1* | 8/2017 | Choi | H04L 9/0861 |
| 2018/0115523 A1* | 4/2018 | Subbarayan | G06N 20/00 |
| 2018/0176091 A1* | 6/2018 | Yoon | H04L 5/1446 |
| 2019/0036821 A1* | 1/2019 | Levy | G06F 12/0868 |
| 2019/0319796 A1* | 10/2019 | Ghosh | H04L 9/3236 |
| 2019/0319804 A1* | 10/2019 | Mathew | G09C 1/00 |
| 2019/0349392 A1* | 11/2019 | Wetterwald | H04L 43/0852 |
| 2019/0379682 A1* | 12/2019 | Overby | H04L 12/40 |
| 2020/0084222 A1* | 3/2020 | William | H04L 63/12 |
| 2020/0259792 A1* | 8/2020 | Devarajan | H04L 63/1416 |
| 2020/0259793 A1* | 8/2020 | Pangeni | H04L 63/0254 |
| 2021/0112034 A1* | 4/2021 | Sundararajan | H04L 47/125 |
| 2021/0374585 A1* | 12/2021 | Ramanathan | G06Q 40/06 |
| 2021/0374761 A1* | 12/2021 | Ramanathan | G06Q 30/018 |
| 2021/0374862 A1* | 12/2021 | Ramanathan | G06N 5/01 |
| 2022/0070223 A1* | 3/2022 | Deng | H04L 63/20 |
| 2022/0247786 A1* | 8/2022 | Vavilala | G06N 20/00 |
| 2022/0400123 A1* | 12/2022 | Ayoub | G06F 3/067 |
| 2023/0023529 A1* | 1/2023 | Jenkins | H04L 9/0631 |
| 2025/0106150 A1* | 3/2025 | Shah | H04L 12/4641 |

* cited by examiner

ADAPTIVE ENFORCEMENT OF SECURITY WITHIN A NETWORK

BACKGROUND

Data creation and consumption have been rapidly growing. In particular, annual data creation increased from 1.2 zettabytes (trillion gigabytes) to an estimated 60 zettabytes from 2010 to 2020. An estimated 22.2 billion client devices accessed wireless local area networks (WLANs) in 2021, a number that has been increasing by over 20% every year since 2016. Meanwhile, 13.8 billion Internet of Things (IoT) devices worldwide are expected to be installed in 2021, and 30.9 billion IoT devices by 2025. In addition to wireless connections, an estimated 1.18 billion wired broadband connections have further contributed to the ever-expanding environment of data. Concurrent with such an increase in data creation and consumption, data security and protection measures have been established to prevent data loss and disruptions in service. Such data security and protection measures may encompass implementing or enforcing access control levels for different users or devices, or categories thereof, and anti-virus, anti-malware, data loss prevention, and firewall policies.

BRIEF DESCRIPTION OF THE DRAWINGS

The present disclosure, in accordance with one or more various examples, is described in detail with reference to the following figures. The figures are provided for purposes of illustration only.

Figure 1:
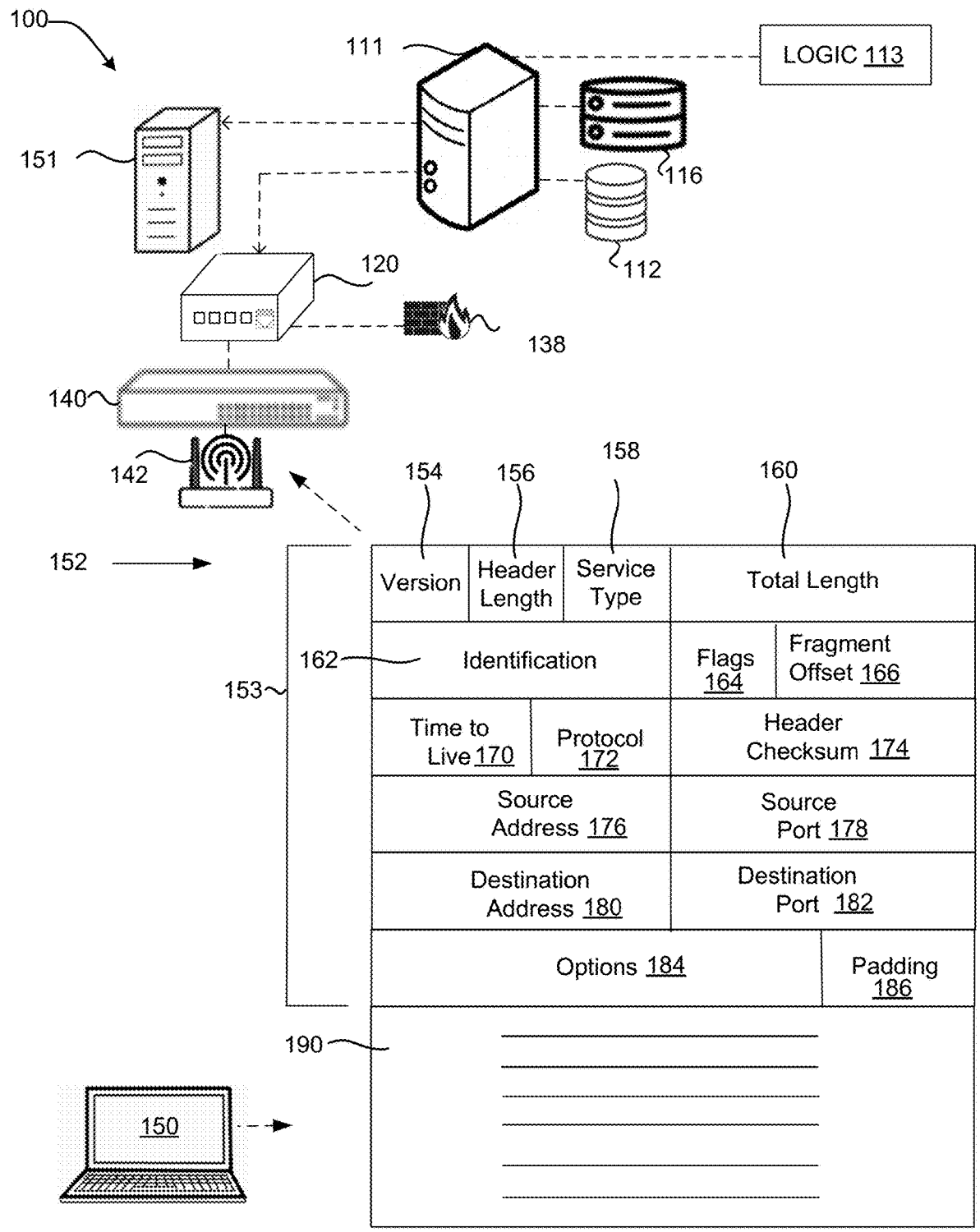
FIG. 1 is an example illustration of a computing system that selectively tailors security policies to a particular session and to current network conditions, by receiving one or more ingress data packets from a client device connected to a network device to access a network, according to examples described in the present disclosure.

The figures are not exhaustive and do not limit the present disclosure to the precise form disclosed.

DETAILED DESCRIPTION

Edge devices such as gateways, routers, servers, firewalls, and/or other devices may implement security policies within networks such as local area networks (LANs), wide area networks (WANs). These security policies may encompass threat detection and prevention, intrusion detection and prevention, antivirus protection, and honeypots. Currently, the edge devices may rely on manual configuration to set the security policies. Furthermore, the edge devices may enforce the security policies statically and inflexibly. In particular, the security policies may remain constant even as conditions or parameters within a network change. Additionally, the security policies may be enforced uniformly no matter a user, device, or application.

An estimated 99% of firewall breaches between now and 2023 will occur due to misconfiguration, such as the rules within the security policies themselves, rather than due to unexpected firewall flaws such as the firewall not performing according to the rules and policies set within the firewall. Additionally, many networks or groups of networks may utilize hundreds of firewalls. These testify to the notion that manual configuration of security policies may not only be inadequate in addressing network security but also impractical as scales of networks and security functions increase.

Thus, to address the foregoing issues, examples provided herein improve security without overly constraining or restricting access to network functions within a network by dynamically determining security policies depending on overall network conditions and parameters, a particular device or user, and a particular application requested or utilized by the particular device. In such a manner, the security policies may be proactively updated once network conditions or parameters change rather than only being reactively updated after an attack occurs, thereby mitigating consequences of an attack. Additionally, security policies may be individually tailored to different users, devices, and applications. For example, if a particular application experiences frequent attacks while a second particular application experiences attacks very rarely, then the security policies of users or devices that access the first particular application may be more stringent compared to those that access the second particular application. If security policies were implemented uniformly across different users, devices, and applications, then not only may certain users, devices, and applications be inadequately protected, but other users, devices, and applications may also be overly constrained due to the security policies being excessively protective. Therefore, by individually tailoring security policies depending on particular users, devices, and applications, data access and other functions within the network may be maintained without compromising security.

Upon receiving a request to connect or an indication that a user or a client device is connecting to a network, a computing system may authenticate the user or the client device, and dynamically determine and/or implement security policies, rules, and/or levels for a session during which the user or the client device is connected to the network. For example, the computing system may receive an ingress packet that indicates that the user or the client device is requesting a commencement of a session to connect to the network. From the ingress packet, the computing system may determine or infer particular characteristics of the user or the client device, such as a history of access at the network or at other network, and particular data or content requested by the user or the client device. Using the particular characteristics as well as network characteristics, the computing system may determine or infer particular security policies, rules, and/or levels for that session.

As a non-limiting example, if the history of access indicates that the user or the client device has previously frequently accessed content or data that is high-risk or which results in security breaches, then the computing system may determine more restrictive security policies or rules for that session, as compared to a scenario in which the user or the client device has previously accessed content or data that is low-risk or rarely results in security breaches. As another example, if the current data or content requested is from an unknown or suspicious source (e.g., a source or application in which security breaches frequently occur), then the computing system may determine more restrictive security policies or rules for that session, as compared to a scenario in which the user or the client device is requesting data or content from a known and/or trustworthy source. As another example, if the network itself is currently being breached (e.g., by malware or other security attacks), or in danger of being breached, then the computing system may determine more restrictive security policies or rules for that session, as compared to a scenario in which the network is not under breach.

Such a manner of dynamically tailoring security policies, rules, or levels to an individual session, depending on a multitude of factors such as the client device or the user, the network itself, and/or the data or content requested, constitutes a technical improvement over many previous network implementations. Such previous network implementations may utilize a blanket approach of adopting a same security policy no matter the user or client device, the data or content being requested, or current network conditions. Therefore, in the current implementation, the computing system may determine security policies to maintain security for the user or the client device and for the network while maintaining the ability for the user or the client device to access the network and requested content or data. Such an implementation is an advantage over previous network implementations, which would be either overly restrictive or inadequate in providing security. For example, previous network implementations may adopt a high-security approach which may secure the network, but be overly restrictive in blocking data or content to users or client devices, even if the users or the client devices pose little to no risk to network security. Alternatively, previous network implementations may adopt a more accessible, low-security approach which may provide access to the network with fewer restrictions, but such an approach may fail to adequately secure the network.

FIG. 1 is an example illustration of an environment such as a network 100 including a computing system or component (hereinafter "computing component") 111 that dynamically and adaptively updates security policies and/or rules depending on changes in network conditions or parameters, users or devices, and applications. The computing component 111 may include one or more physical devices or servers, or cloud servers on which services or microservices run. The computing component 111 may control functions of, be associated with and/or connected to one or more edge devices such as access points, gateways, routers, switches, or other network devices. For example, in FIG. 1, the computing component 111 may be associated with a gateway 120, a switch 140, an access point 142, and/or one or more other servers such as an authentication server 151, which may include a Remote Authentication Dial-In User Service (RADIUS) server.

A firewall 138 may be associated with or within the gateway 120. Although the firewall 138 is illustrated as associated with the gateway 120, in alternative examples, the firewall 138 may be an independent entity (e.g., not associated with any network device) or associated with a different network device, such as, the access point 142. In some examples, the firewall 138 may utilize security rules not only on a level of a network device or a port, but also on a level of individual applications running on a network device or a client device connected to the network device. The security rules may indicate whether to permit or deny particular applications. The firewall 138 may inspect payloads within data packets (e.g., a packet 152 from a client device 150), rather than only headers within the data packets. In some examples, the firewall 138 may filter data packets based on an application layer (e.g., layer 7) of the Open Systems Interconnect (OSI) model. The firewall 138 may also monitor for malicious activity within a network device based on signatures, activities or activity patterns, or behavior patterns.

Figure 2:
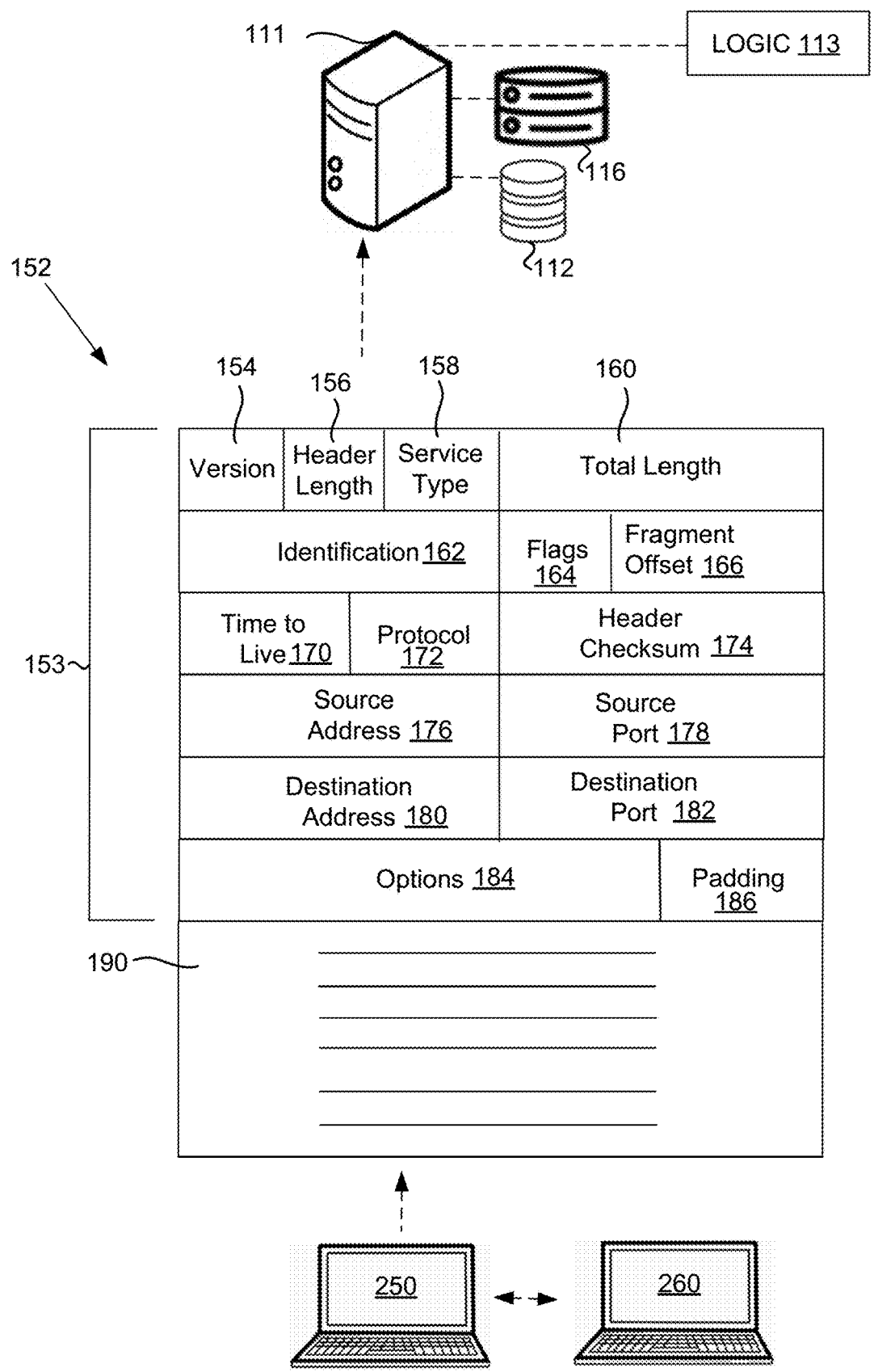
FIG. 2 is an example illustration of a computing system that selectively tailors security policies to a particular session and to current network conditions, by receiving one or more ingress data packets from a user, which accesses a network without connecting to a network device, according to examples described in the present disclosure.

The computing component 111, and/or the authentication server 151, may authenticate a client device 150 in response to the client device 150 transmitting the packet 152. During authentication, a particular role and/or access level of the client device 150 may be determined and established following a change of authorization (CoA). Upon the client device 150 getting authenticated at and connecting to any one or more of the aforementioned network devices (e.g., the access point 142, the switch 140, or the gateway 120), the computing component 111 may determine, implement, and/or enforce security policies for the client device 150. In some examples, the security policies may include intrusion detection policies, anti-malware policies, firewall policies, and/or data access policies. The client device 150 may have authorization to access and/or write to a subset (e.g., a portion or all of) the data via the network device. Although only a single client device is illustrated for simplicity, the network 100 may include a plurality of client devices, each of which may be authenticated in a same manner. In other examples, as illustrated in FIG. 2, a user 250 may connect in an ad-hoc manner, directly to one another without additional network devices. In such a scenario, the computing component 111 may determine, control, and/or implement security policies applied to the user 250.

Referring back to FIG. 1, the computing component 111 may also be associated with (e.g., physically and/or electrically connected to) a database 112 that stores protocols to perform functions by the computing component 111 and information generated by the computing component 111. For example, the information generated by the computing component 111 may include information regarding the network 100 including network conditions or parameters, information regarding users or devices (e.g., client devices 150, 160, and 170), and information regarding applications. The information may encompass attributes, metrics, parameters, and/or capabilities of the network 100, of users or devices, and of applications, as will be described with respect to FIG. 3. In some examples, the computing component 111 may cache a subset of the information stored in the database 112 in a cache 116. For example, the computing component 111 may cache any of the information within the database 112 that may be frequently accessed, referenced, or analyzed, and/or may be frequently changing (e.g., having a higher than a threshold standard deviation and/or higher than a threshold variability with respect to time).

In FIG. 1, the computing component 111 may receive the packet 152 from one of the client devices or users (e.g., the client device 150). The packet 152 may be transmitted to the gateway 140 or to another edge device en route to the computing component 111. The packet 152 may be an ingress packet, or an initial packet of a session received from the client device 150. Though the client device 150 is illustrated in FIG. 1, and referred to in subsequent FIGS., the principles described below may also be applicable to other client devices and non-client devices such as the user 250 in FIG. 2, in which scenario the computing component 111 may receive the packet 152 directly from the user 250.

The packet 152 may include a header 153 and a payload 190. The header 153 may include any of a version 154, a header length 156, a service type 158, a total length 160, an identification 162, flags 164, a fragment offset 166, a time to live (TTL) 170, a protocol 172, a header checksum 174, a source address 176, a source port 178, a destination address 180, a destination port 182, options 184, and padding 186.

The version 154 may indicate an internet protocol (IP) version, which may be 4 or 6. The header length 156 may indicate a size of the header 153, in 32-bit words. The type of service 158 may provide a suggested quality of service, and may be set to zero. In some examples, the type of service 158 may indicate any of low-delay path, high-bandwidth path, and high-reliability path services. The total length 160 may indicate a total size of the header 153 and the payload 190. The identification 162 may be a 16-bit number that provides instructions to a destination to assemble a return packet to be returned to the client device 150. The flags 164 may include a bit that indicates to the router 120 whether or not the router 120 may fragment the packet 152. The fragment offset 166 may include a value to reconstruct a fragmented packet and may indicate a relative position of the packet 152 within a data stream, such as a relative position within a file if the file is broken up into multiple packets. The time to live (TTL) 170 indicates a maximum duration, or a maximum number of hops, that the packet 152 can take before being discarded. The TTL 170 may be decremented every time the packet 152 is routed. Once decremented to zero, the packet 152 may be discarded. The protocol 172 indicates a type of packet (e.g., Transmission Control Protocol (TCP), User Datagram Protocol (UDP), Internet Control Message Protocol (ICMP), Internet Group Management Protocol (IGMP), or Serial Data Transport Protocol (SDTP)). The header checksum 174 may include a value that the router 120 verifies to detect whether corruption of the header 152 has occurred. The source address 176 may be an IP address of the client device 150 (e.g., 192.168.0.102). The source port 178 may be a specific port, process, service, or application within the source IP address 176 (e.g., 33790) indicating a specific session of the client device 150. The destination address 180 may be an IP address of the destination from which data is requested, such as a particular server that stores the data which is requested (e.g., 93.123.37.35). The destination address 180 may be obtained by the computing component 111 via Domain Name System (DNS) resolution. The destination port 182 may be a specific port, process, service, or application within the destination address 180 (e.g., 80). For example, particular services may correspond to Hypertext Transfer Protocol (HTTP), File Transfer Protocol (FTP), or Teletype Network Protocol (Telnet), or Secure Socket Shell (SSH). A port value corresponding to a HTTP request may be 80. The options 184 may specify security, source routing, error reporting, debugging, time stamping, and other attributes. The padding 186 may indicate options to add zero bits in order to make the header 153 have a length of a multiple of 32 bits.

The computing component 111 may inspect one or more packets, including the packet 152 to determine parameters or attributes. The parameters or attributes may be part of a criteria by the computing component 111 in order to determine security policies for a particular session that the packet 302 is included in. For example, the computing component 111 may determine an identity of the client device 150 from inspection of the header 153, in particular, the source address 176 which may indicate an IP address and/or the source port 178. The computing component 111 may retrieve, for example, from the database 112 and/or the cache 116, information regarding the client device 150, following the determination of the identity of the client device 150. The information may include, or be divided into specific categories that encompass, for example, 1) a location (e.g., the source address 176 of the client device 150 or a physical location), 2) a bandwidth consumption by different categories of applications, such as, between critical compared to non-critical applications, 3) a request history or browsing history of the client device 150, 4) security content within the client device 150 which may indicate security applications or programs already installed within the client device 150, 5) a threat level of the client device 150 which may be indicative of a frequency of previous security vulnerabilities or issues from the client device 150, and/or 6) a role (e.g., common user, administrator, special privileged role such as president, or executive) assigned to the client device 150 during authentication.

Additionally, the computing component 111 may determine an identity of a destination, such as an application, from inspection of the header 153, in particular, the destination address 180 and/or the destination port 182. Historical information regarding the identity of the destination may be retrieved from the database 112 and/or the cache 116 by the computing component 111.

The computing component 111 may retrieve, extract, obtain, or determine at least a subset of the information from additional sources besides the packet 152. For example, the computing component 111 may determine some of the information via network telemetry from the network devices such as the access point 142, the switch 140, or the gateway 120. In particular, the bandwidth consumption by different categories of applications may be obtained via network telemetry from one or more of the network devices corresponding to previous sessions. The information may be measured at given intervals, such as 5-minute intervals, 10-minute intervals, 1-hour intervals, 24-hour intervals, and/or averaged over such intervals.

As mentioned above, one category of the information may be a location. the location may indicate a priority, precedence, or a level of criticality of network access. For example, if a high amount or proportion of tasks or data is being performed or accessed at a particular location, then the computing component 111 may set less restrictive security policies, all other factors being equal, at the particular location compared to other locations.

A second category of the information may be a bandwidth consumption or allocation across different categories of data access, such as, across critical applications compared to non-critical applications. The determination of whether an application is critical or non-critical may be dependent upon the role of the client device 150. For example, if the client device 150 were assigned a role of administrator, a particular administrative application may be critical, but if the client device 150 were assigned a non-administrative role, then the particular administrative application may be non-critical. The bandwidth consumption by different categories or applications may be indicative of a historical bandwidth consumption, such as, over a most recent duration of time (e.g., a previous 24-hour period, a previous one-week period, a previous one-month period, or over a lifetime of the client device 150). To compute a score or metric indicative of the bandwidth consumption, a first weight applied to a percentage of bandwidth consumed by non-critical applications and a second weight applied to a percentage of bandwidth consumed by critical applications may be different. For example, the first weight may be higher than the second weight. In a specific example, the score may be computed by taking 0.3 times the percentage of bandwidth consumed by critical applications summed to 0.7 times the percentage of bandwidth consumed by non-critical applications. Therefore, if a client device 150 tends to consume a larger percentage of bandwidth from non-critical applications, the computing component 111 may determine more stringent security measures to be applied to the client device 150, all else being equal.

Meanwhile, a third category of the information may be a request or browsing history. The request or browsing history may be determined based on times and days of requests by the client device 150 and responses to the client device 150, categories of data, such as categories of web pages, requested by the client device 150, file types, a data types, and/or a content types requested by the client device 150, and/or IP addresses, domains, or uniform research locators (URLs) requested by the client device 150. For example, if the client device 150 frequently requests during times of relatively heavy traffic, the computing component 111 may determine more stringent security measures to be applied to the client device 150, all else being equal.

A fourth category of the information may be a reputation, which may be determined based on content requested or accessed by the client device 150. For example, the reputation of the client device 150 may be based on reputation information associated with one or more web domains previously accessed by or hit from the client device 150 within a previous period of time, such as a most recent week, or a most recent 30-day period. The reputation information of a web domain may be based on an analysis of an index page of the web domain, or downloads from other known domains. For example, the reputation information may be based on a number, proportion, and/or percentage of hits, such as intrusion prevention signature hits and/or portable executable download hits, to the web domain, and/or based on a number, proportion, and/or percentage of hits from other domains known to be malicious or known to be non-malicious. Examples of such prevention signatures include, without limitation, blocking signatures that trigger when an application makes a Hypertext Transfer Protocol (HTTP) request for an image and receives a different file, such as a Portable Executable (PE) file in response, blocking signatures that, when triggered, block access to a web domain or block downloading of PEs, silent signatures that, when triggered, monitor a web domain or add a web domain to a blacklist without blocking the same, silent signatures that trigger when a non-browser application downloads a PE file from an IP address, silent signatures that trigger when a non-browser application downloads a PE file from a Hypertext Preprocessor (PHP) script, blocking signatures that trigger when a PE file is downloaded from a known fake scan PE download URL pattern, silent signatures that trigger when a PE file is downloaded by known-malicious applications (e.g., XRun.exe), silent signatures that trigger when a PE file is downloaded by a system process (e.g., winlogon.exe, explorer.exe), silent signatures that trigger when a PE file is downloaded from particular domains (e.g., .pl, .cn, .br), silent signatures that trigger when a PE file is downloaded by certain suspicious applications (e.g., [a-z].exe, movie.exe, codec.exe, etc.), and/or silent signatures that trigger when a PE file is downloaded by particularly vulnerable applications (e.g., ADOBE™ applications, such as those including or referencing acrord32.exe, or MICROSOFT OFFICE™ applications, such as those including or referencing powerpnt.exe, winword.exe, excel.exe). Additionally, or alternatively, one or more of the aforementioned signatures may be blocking instead of silent (or vice-versa). In some examples, the reputation of the web domain may be based on third-party evaluations.

A fifth category of the information may be a threat may be determined based on attributes of events related to the client device 150. The attributes may indicate a severity, a confidence level, and/or a stage. The threat may further be determined based on cross-event correlation information, such as, a stage change across events, of associated devices or a network that the client device 150 resides in. Detection of events is done via tagging of a flow which may be based on rule-based, such as domain generation algorithm (DGA), HTTP header order detection and bittorrent, or third-party data correlation-based, such as Indicators of Compromise (IOC). Particular examples of events include Domain Name System (DNS) Exfiltration/DNS-Dictionary-DGA, HTTP header misspelling/Disordering, Secure Sockets Layer (SSL) expired Certificate/SSL-Inactive-Certificate, Suspicious-Portable Document Format (PDF), spyware, malware, or adware infiltration, or a hacking tool infiltration on the client device 150. Features, attributes, or characteristics may be extracted from the events, including a degree of severity and/or a degree of confidence of the events, a number of attack stages hit at the client device 150 and/or a total number of attack stages hit by the event, a number of detection types hit at the client device 150 and/or a total number of detection types (e.g., types of events), and/or a total score across the events. For example, a score of the threat may be computed by a*maximum_event_score+ b*attack_stage_feature+c*total_score_feature+ d*detection_type_feature. The maximum_event_score may be assigned to the client device 150 if at least one event satisfies both a high level of severity and a high level of confidence. The attack_stage_feature may be the number of attack stages hit at the client device 150 divided by the total number of attack stages hit by the event. The detection_type_feature may be the number of detection types hit at the client device 150 divided by the total number of detection types. The total_score_feature may be computed by a sum of all event scores corresponding to events on the client device 150 divided by a maximum sum of event scores compared across all client devices or users (for example, within the network 100. In some examples, a, b, c and d may be numerical values. A may be larger than b, b maybe larger than c, and c may be larger than d. A sum of a, b, c, and d may be one. In a particular example, a may be 0.5, b may be 0.25, c may be 0.15, and d may be 0.1.

A sixth category of the information may be a role. A particular role of a user operating the client device 150 may be correlated to a particular score. For example, a guest role may have a maximum score (e.g., one) indicating a most restrictive security policy. Other specialized roles may have lower scores indicating a less restrictive security policy. Some different roles may be assigned a common score.

Figure 3:
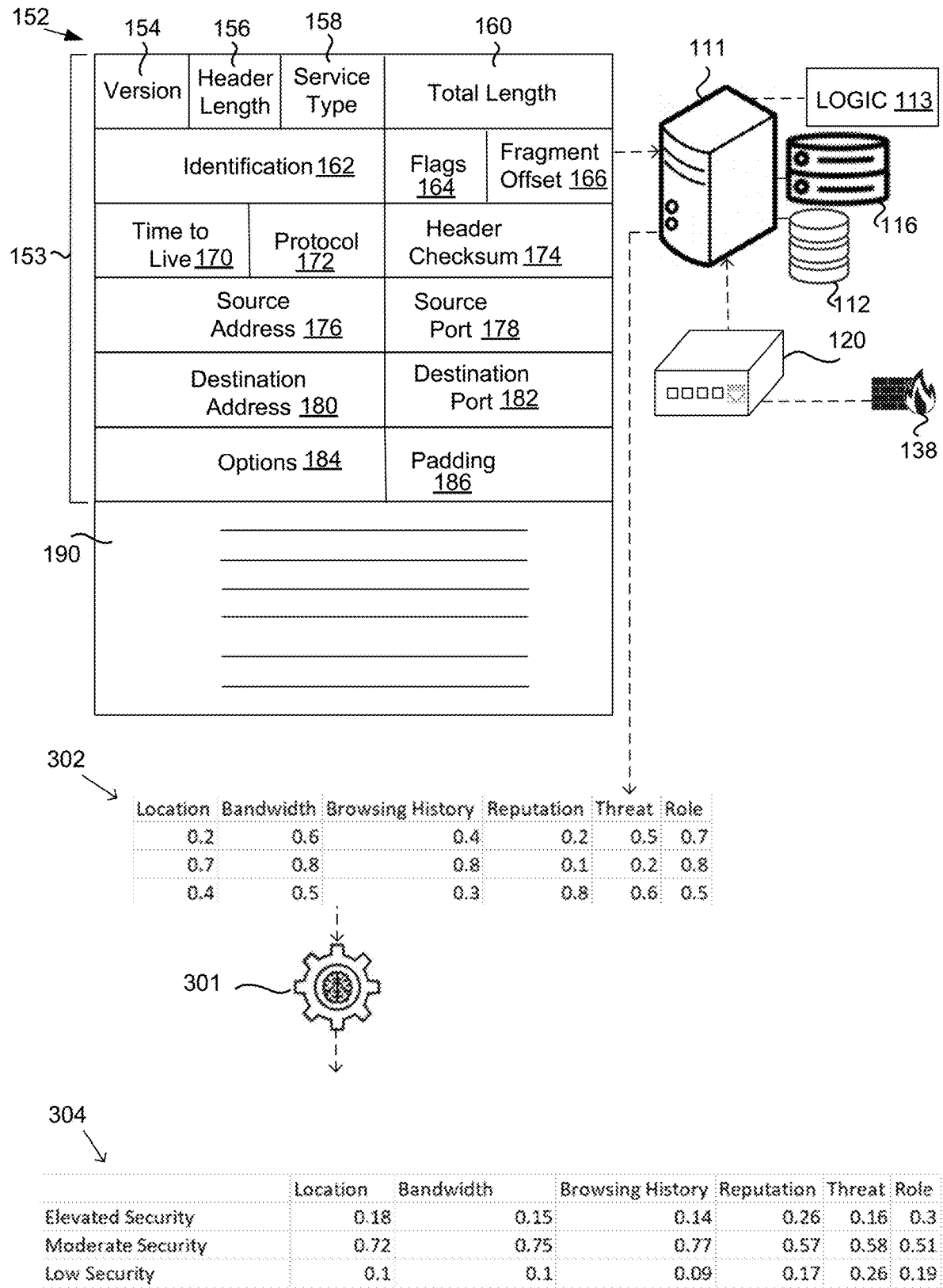
FIG. 3 is an example of a computing system that generates, from attributes of a session, an embedding vector indicating attributes or parameters of a client device or a user, according to examples described in the present disclosure. The embedding vector may be generated with respect to different security levels.

The computing component 111 may reformat and/or normalize at least a subset of the information, such as the information relating to the client device 150 or the user, into modified information 302, as illustrated in FIG. 3. The computing component 111 may feed the modified information 302 to a machine learning component 301. The machine learning component 301 is illustrated in FIG. 3 as being separate from the computing component 111, but the machine learning component 301 may be integrated within the computing component 111. The modified information 302 may include parameters and/or attributes indicative of a security level of a particular session. In particular, the modified information 302 in FIG. 3 may refer specifically to the client device (e.g., the client device 150) or a user (e.g., the user 250). The modified information 302 may be normalized to values between zero and one, in which values close to zero indicate or suggest a high degree of security of a particular session, and that a low level of or no additional security is to be implemented, while values close to one indicate or suggest a low degree of security of a particular session, and that a high amount or level of additional security is to be implemented.

The machine learning component 301 may convert or map the modified information 302 into an embedding vector 304 that captures semantic meanings and relationships of the modified information 302, while representing the modified information 302 in a condensed format with reduced dimension and a continuous relation space. The embedding vector 304 may be a result of a conversion or a mapping of the modified information 302, and may indicate or numerically represent particular security attributes of the client device 150 or the user 250. The particular security attributes may indicate or predict a degree or level of susceptibility of the client device 150 or the user 250 to security threats such as intrusion, malware, viruses, data loss, and/or other attacks that compromise security.

In one scenario, the embedding vector 304 may indicate probabilities of matching or correspondence of, or degrees or similarity between, the modified information 302 and information corresponding or mapped to different security levels or ranges or different levels or ranges of client devices or users. The embedding vector 304 may indicate, for example, a probability, within a particular session, of a particular aspect or category (e.g., bandwidth consumption) of the client device 150 or the user 250, and/or of combined aspects or categories of the client device 150 or the user 250, matching a particular security aspect or category, such as an overall low security level (e.g., level of danger or risk), medium security level, and/or a high security level, or a low malware security level, medium malware security level, or high malware security level.

As illustrated in FIG. 3, individual categories, such as the aforementioned location, bandwidth consumption, request or browsing history, security content, threat level, and/or role of the client device 150, may be compared with respective individual categories of an elevated security level, a moderate security level, and a low security level. Using such a process, the machine learning component 301 may determine a probability of correspondence of, a degree of correspondence of, or a degree of matching between the client device 150 and a profile of an elevated security level, a moderate security level, or a low security level, regarding each individual category, a combination of categories, and/or in totality. The profiles of an elevated security level, a moderate security level, or a low security level may be mapped to or associated with previous known client devices or users. For example, regarding the category of bandwidth consumption, the machine learning component 301 may output that the client device 150 has a 75 percent probability of being mapped to a moderate security level, a 15 percent probability of being mapped to an elevated security level, and a 10 percent probability of being mapped to a low security level. Such an output, indicating probabilities that one or more aspects of the modified information 302 correspond to particular security attributes such as security levels, is one aspect or example of the embedding vector 304. Other categories or aspects, besides bandwidth consumption, of the modified information 302 may be compared in a same or similar manner.

Figure 4:
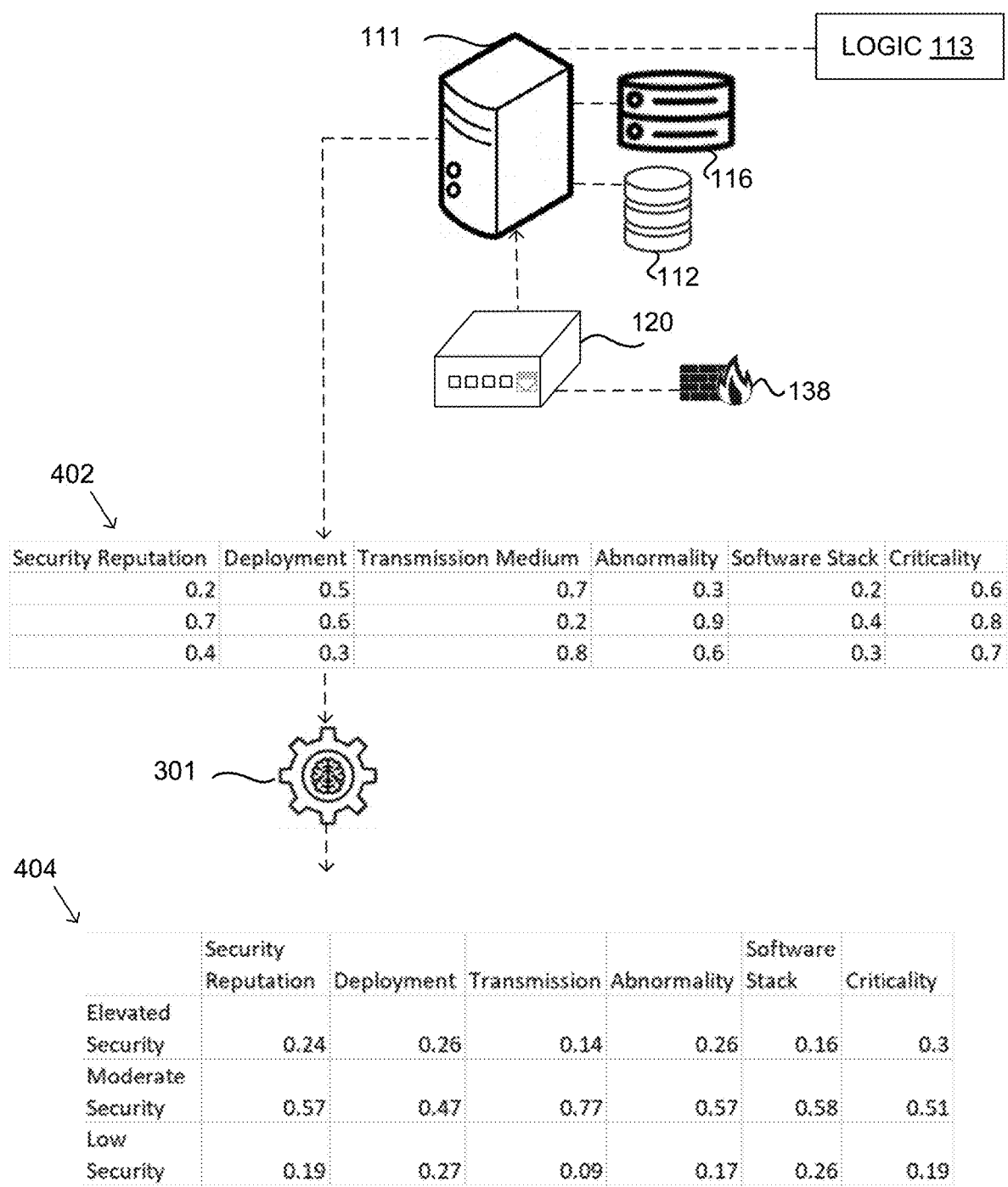
FIG. 4 is an example of a computing system that generates, from attributes of a session, an embedding vector indicating attributes or parameters of a destination from which the client device or the user is seeking data, according to examples described in the present disclosure. The embedding vector may be generated with respect to different security levels.
Figure 5:
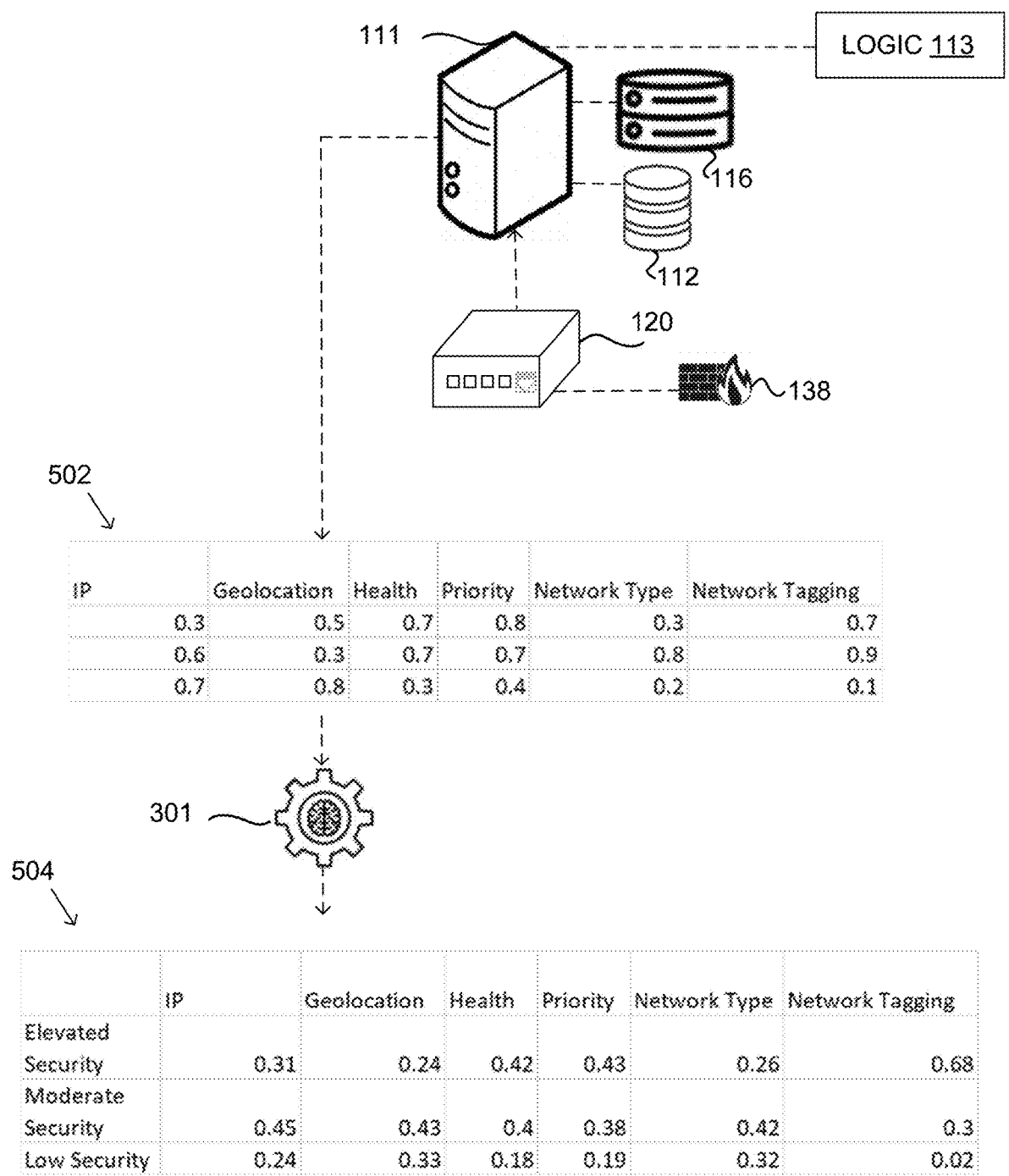
FIG. 5 is an example of a computing system that generates, from attributes of a session, an embedding vector indicating attributes or parameters of a network in which the client device or the user is situated, according to examples described in the present disclosure. The embedding vector may be generated with respect to different security levels.
Figure 6:
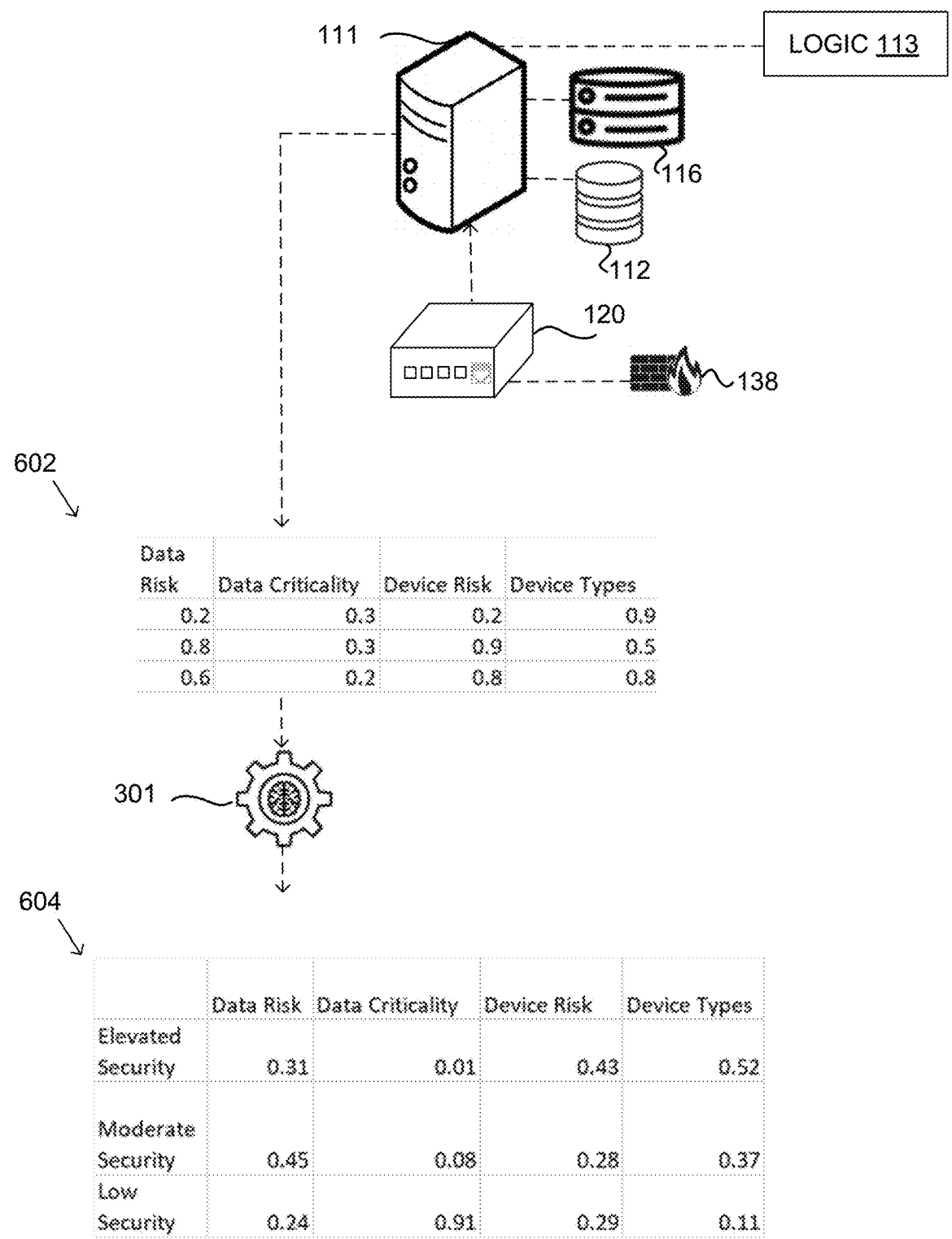
FIG. 6 is an example of a computing system that generates, from attributes of a session, an embedding vector indicating contextual attributes or parameters, according to examples described in the present disclosure. The embedding vector may be generated with respect to different security levels.

Same or similar principles may also be applied to other aspects of the modified information, including the information regarding application (e.g., destination) aspects, as illustrated in FIG. 4, information regarding network aspects as illustrated in FIG. 5, and information regarding other contextual aspects, as illustrated in FIG. 6. Thus, the determination of security policies involves a combination of factors, including the user or the device, the application, the network, and other contextual aspects. In FIG. 4, the computing component 111 may reformat and/or normalize at least a subset of the information, such as the information relating to a destination to which the packet 152 is addressed, which may be extracted or determined by the destination address 180 and/or the destination port 182 of the packet 152. For example, if the client device 150 is requesting access to read and/or write to a particular data source, such as a website, the destination may be a server or host of that particular data source, as indicated by the destination address 180. The information regarding the application aspects may include, or be divided into specific categories that encompass, for example, 1) a security reputation; 2) a deployment; 3) a transmission medium; 4) a state and abnormality metric; 5) a software stack; and/or 6) a criticality.

The security reputation of the destination may be based on historical security issues or events, attacks, vulnerabilities, and/or threats. The deployment may encompass a nature or location of the deployment, such as, a cloud deployment, an internal application, or a network application on physical premises, or whether the deployment is hosted in a public or a private server. In some examples, an application on physical premises may have a lower security score compared to a cloud deployment, indicating a lower security risk, all else being equal. Meanwhile, the transmission medium may indicate whether or not, and an extent to which, a transmission protocol is secured. For example, transmission protocols such as HTTP and SSL may be secured and have a lower security score compared to unsecured transmission protocols. The transmission medium may be obtained by the protocol 172 of the header 153 of the packet 152, or from another source. Next, the state and abnormality metric may indicate a control state or other parameters regarding an abnormality in a destination, and may be obtained from log information, such as application log information. Additionally, the software stack of the destination may encompass one or more types of software, configurations, loads (e.g., load balance among different software) and/or scales handled by the software, operating system (OS) versions, software versions, corresponding user accounts, Kernel versions or modules loaded, running processes, OS registry databases, .plist files, running processes, Daemon, background, and persistent processes, startup operations, launched entries, application and system errors encountered, DNS lookups, network connections, system schedule changes, application and/or system errors of or associated with the destination.

The modified information 402 may be normalized to values between zero and one, in which values close to zero indicate or suggest a high degree of security of a particular session, and that a low level of or no additional security is to be implemented, while values close to one indicate or suggest a low degree of security of a particular session, and that a high amount or level of additional security is to be implemented.

The machine learning component 301 may convert or map the modified information 402 into an embedding vector 404 that captures semantic meanings and relationships of the modified information 402, while representing the modified information 402 in a condensed format with reduced dimension and a continuous relation space. The embedding vector 404 may be a result of a conversion or a mapping of the modified information 402, and may indicate or numerically represent particular security attributes of the destination to which the packet 152 is addressed (e.g., source where the client device 150 or the user 250 is requesting content or data). The particular security attributes may indicate or predict a degree or level of susceptibility of the destination to security threats such as intrusion, malware, viruses, data loss, and/or other attacks that compromise security.

In one scenario, the embedding vector 404 may indicate probabilities of matching or correspondence of, or degrees or similarity between, the modified information 402 and information corresponding or mapped to different security levels or ranges or different levels or ranges of destinations (e.g., applications). The embedding vector 404 may indicate, for example, a probability of a particular aspect or category (e.g., software deployment) of the destination, and/or of combined aspects or categories of the destination, matching a particular security aspect, such as a low security level, medium security level, and/or a high security level.

As illustrated in FIG. 4, individual categories, such as the aforementioned security reputation, deployment, transmission medium, state and abnormality metrics, and software stacks, of the destination, may be compared with respective individual categories of an elevated security level, a moderate security level, and a low security level. Using such a process, the machine learning component 301 may determine a probability of correspondence of, a degree of correspondence of, or a degree of matching between the destination and a profile of an elevated security level, a moderate security level, or a low security level, regarding each individual category, a combination of categories, and/or in totality. The profiles of an elevated security level, a moderate security level, or a low security level may be mapped to or associated with previous known destinations. For example, regarding the category of deployment, the machine learning component 301 may output that the destination has a 47 percent probability of being mapped to a moderate security level, a 26 percent probability of being mapped to an elevated security level, and a 27 percent probability of being mapped to a low security level. Such an output, indicating probabilities that one or more aspects of the modified information 402 correspond to particular security attributes such as security levels, is one aspect or example of the embedding vector 404. Other categories or aspects, besides the deployment, of the modified information 402 may be compared in a same or similar manner.

In FIG. 5, the computing component 111 may reformat and/or normalize at least a subset of the information, such as the information relating to a network (e.g., the network 100), into modified information 502. For example, information regarding the network may be obtained from network telemetry. The information of the network may be divided into specific categories that encompass, for example, 1) a type of network (e.g., local area network (LAN), software defined LAN (SDLAN), wireless LAN (WLAN), cloud networks, on premise networks, metropolitan area networks (MAN)), 2) IP addresses within the network, 3) geolocation (e.g., country or city), 4) health parameters 4) classification and/or distribution of priority traffic flows, 5) classification based on network type, and 6) classification based on network tagging. In particular, the IP addresses within the network may be checked to determine existence of malicious IP addresses, which may be broken down into categories such as Windows™ exploits, web attacks, phishing, and bot network (Botnet) attacks. Examples of health parameters may include jitter, latency, packet loss, and round trip time. Classification of priority traffic flows may encompass aggregated priority traffic flows, indicated by Quality of Service (QoS), which accounts for QoS flow indicators given by IP Type of Service (ToS) or Differentiated Services Code Point (DSCP) values for the network 100. QoS may assign a priority to each packet based on data contained within the header and a transmission policy. A higher priority packet may exit the network prior to a lower priority packet. For example, among highest priority packets may include network control and routing traffic, followed by voice or Voice over IP (VoIP) traffic. If a high proportion (e.g., exceeding a threshold proportion) of packets have been indicated at a high QoS, then the security settings, such as cryptography settings, may be reduced because higher security in some aspects may limit the QoS. The computing component 111 may determine a score indicative of the classification of priority traffic flows based on ratios of priority of queues. Meanwhile, network tagging may indicate a type or sector of the network 100 or of users or devices within the network 100. The network tagging may be based on tags including education, healthcare, retail, enterprise, and service provider. Tags may be applied based on certain attributes of the network 100 and/or of users or devices within the network 100. For example, education tagging may include floating user and device populations that utilize device based authentication. Healthcare tagging may encompass relatively sensitive data and network parameters or attributes. Retail tagging may include digital transformation and Internet of Things (IoT) devices. Enterprise tagging may include IP Security (IPSec) tunnels and application aware firewall traffic with Access Control Lists (ACLS) and Role-Based Access Control (RBAC). Service provider tagging may include multi-tenant networks and cloud security policies.

The modified information 502 as described above may be normalized to values between zero and one, in which values close to zero indicate or suggest a high degree of security of a particular session, and that a low level of or no additional security is to be implemented, while values close to one indicate or suggest a low degree of security of a particular session, and that a high amount or level of additional security is to be implemented.

The machine learning component 301 may convert or map the modified information 502 into an embedding vector 504 that captures semantic meanings and relationships of the modified information 502, while representing the modified information 502 in a condensed format with reduced dimension and a continuous relation space. The embedding vector 504 may be a result of a conversion or a mapping of the modified information 502, and may indicate or numerically represent particular security attributes of the network 100. The particular security attributes may indicate or predict a degree or level of susceptibility of the network 100 to security threats such as intrusion, malware, viruses, data loss, and/or other attacks that compromise security.

In one scenario, the embedding vector 504 may represent probabilities of matching or correspondence of, or degrees or similarity between, the modified information 502 and information corresponding or mapped to different security levels or ranges or different levels or ranges of networks. The embedding vector 504 may indicate, for example, a probability of a particular aspect or category (e.g., classification of priority traffic flows) of the client network 100, matching a particular security aspect, such as a low security level, medium security level, and/or a high security level.

As illustrated in FIG. 5, individual categories, such as the aforementioned classification of priority traffic flows of the network 100, may be compared with respective individual categories of an elevated security level, a moderate security level, and a low security level. Using such a process, the machine learning component 301 may determine a probability of correspondence of, a degree of correspondence of, or a degree of matching between the network 100 and a profile of an elevated security level, a moderate security level, or a low security level, regarding each individual category, a combination of categories, and/or in totality. The profiles of an elevated security level, a moderate security level, or a low security level may be mapped to or associated with previous known networks. For example, regarding the category of priority traffic flows, the machine learning component 301 may output that the network 100 has a 38 percent probability of being mapped to a moderate security level, a 43 percent probability of being mapped to an elevated security level, and a 19 percent probability of being mapped to a low security level. Such an output, indicating probabilities that one or more aspects of the modified information 502 correspond to particular security attributes such as security levels, is one aspect or example of the embedding vector 504.

In FIG. 6, the computing component 111 may reformat and/or normalize at least a subset of the information, such as the information relating to contextual information, which may be extracted or determined from the packet 152 and/or from the network 100, into modified information 602. The contextual information may include a level of danger of the data requested, criticality of the data requested, a level of danger of the client device 150 and/or one or more network devices (e.g., the network device 140), and a level of diversity in the types of devices existing within the network 100. In some examples, the level of danger of the data requested may be based on a type of the data requested. As a particular scenario, multimedia content may have a higher level of danger compared to text data. Meanwhile, the criticality of the data may also be dependent upon a type of the data requested, and/or how widely available the data is. For example, confidential or secretive data may be more critical compared to data that is widely and publicly available, and security of the former may be heightened. Next, a level of danger of a client device and/or of a network device may be based on a location of the client device and/or the network device. For example, a client device or a network device residing within a gateway may have a higher level of danger compared to a client device or other device within an intranet. Thus, a level of security corresponding to a client device or network device on a gateway may be higher. Lastly, the level of diversity may be reflected by an aggregation of different security profiles of different client devices and/or network devices within the network 100. In some examples, the higher the level of diversity, the higher the security level to be enforced.

The modified information 602 may be normalized to values between zero and one, in which values close to zero indicate or suggest a high degree of security of a particular session, and that a low level of or no additional security is to be implemented, while values close to one indicate or suggest a low degree of security of a particular session, and that a high amount or level of additional security is to be implemented.

The machine learning component 301 may convert or map the modified information 602 into an embedding vector 604 that captures semantic meanings and relationships of the modified information 602, while representing the modified information 602 in a condensed format with reduced dimension and a continuous relation space. The embedding vector 604 may be a result of a conversion or a mapping of the modified information 602, and may indicate or numerically represent particular security attributes of the contextual information. The particular security attributes may indicate or predict a degree or level of susceptibility indicated by the contextual information to security threats such as intrusion, malware, viruses, data loss, and/or other attacks that compromise security.

In one scenario, the embedding vector 604 may indicate probabilities of matching or correspondence of, or degrees or similarity between, the modified information 602 and information corresponding or mapped to different security levels or ranges or different levels or ranges based on the contextual information. The embedding vector 604 may indicate, for example, a probability of a particular aspect or category (e.g., data criticality) of the contextual information, and/or of combined aspects or categories of the destination, matching a particular security aspect, such as a low security level, medium security level, and/or a high security level.

As illustrated in FIG. 6, individual categories, such as the aforementioned data criticality, may be compared with respective individual categories of an elevated security level, a moderate security level, and a low security level. Using such a process, the machine learning component 301 may determine a probability of correspondence of, a degree of correspondence of, or a degree of matching between the contextual information and a profile of an elevated security level, a moderate security level, or a low security level, regarding each individual category, a combination of categories, and/or in totality. The profiles of an elevated security level, a moderate security level, or a low security level may be mapped to or associated with previous known contextual information corresponding to different client devices, destinations, and/or networks. For example, regarding the category of data criticality, the machine learning component 301 may output that the destination has an 8 percent probability of being mapped to a moderate security level, a 1 percent probability of being mapped to an elevated security level, and a 91 percent probability of being mapped to a low security level. Such an output, indicating probabilities that one or more aspects of the modified information 602 correspond to particular security attributes such as security levels, is one aspect or example of the embedding vector 604. Other categories or aspects, besides the data criticality, of the modified information 602 may be compared in a same or similar manner.

Although the embedding vectors 304, 404, 504, and 604 indicate probabilities of matching or correspondence, or degrees of similarity to different overall security levels, the embedding vectors 304, 404, 504, and 604 may indicate probabilities of matching or correspondence, or degrees of similarity to individual aspects of security levels, such as intrusion, malware, viruses, or data loss. For example, the combination of the embedding vectors 304, 404, 504, and 604 may indicate that given attributes of the client device 150 or the user 250, the destination, and the network 100 in a particular session, a security vulnerability to intrusion is high but a security vulnerability to malware and viruses is low.

Following the generation of embedding vectors 304, 404, 504, and 604, a machine learning component 701 may receive the aforementioned embedding vectors and determine a security policy based on, or mapped to, the aforementioned embedding vectors. The machine learning component 701 may be integrated within or associated with the computing component 111. The machine learning component 701 may be trained, for example, in a sequential or iterative process. A first training dataset fed into the machine learning component 701 may include correct mappings of embedding vectors, or the attributes or parameters (e.g., represented by the modified information 302, 402, 502, and/or 602) to particular security policies. A second training dataset may be generated following testing of the machine learning component 701. For example, the machine learning component 701 may, following the initial training, map a test set, or an actual set, of embedding vectors, or the attributes or parameters, to security policies. A second training dataset may be generated based on any incorrect mappings by the machine learning component 701.

The machine learning component 701, for example, fully connected (FC) layers of the machine learning component 701, may determine particular aspects of a security policy, including, operating system aspects 702, networking aspects 704, cryptography aspects 706, and application aspects 708. For example, the operating system aspects 702 may include User Interface Privilege Isolation (UIPI), or Mandatory Integrity Control, and/or other mechanisms to combat shatter attacks, random number generator entropy levels, and capability separation. Additionally, the networking aspects 704 may include security intrusion detection aspects, anti-malware aspects, anti-virus aspects, data loss prevention aspects, and/or firewall aspects. Other networking aspects 704 aspects may include IP Address Management (IPAM), content inspection, Secure Sockets Layer (SSL) validations, transport protocols, Domain Name System (DNS) security, Dynamic Host Configuration Protocol (DHCP) security, certification validation, and/or URL validation. Security intrusion, anti-malware, anti-virus, data loss prevention, and/or firewall aspects may each be classified into discrete classifications of policies or settings, such as, lenient, moderate, and strict classifications. The network level aspects 704 may include data formatting and/or processing, such as packet or frame processing techniques on data to be transmitted to devices or users. The cryptographic aspects 706 may include algorithms and protocols such as tunneling parameters or encryption settings. The tunneling parameters may indicate a type of tunneling such as IPSec tunnels, and particular settings of tunneling. For example, data traffic from client devices such as the client device 150 may be tunneled to a data center and aggregated by a corresponding VPN client at the data center.

The application aspects 708 may include access control and/or log auditing policies. The particular aspects of the security policy may be outputted into a softmax layer 711 which may further determine and outlet levels of confidence of the particular aspects of the security policy. If the levels of confidence do not satisfy one or more threshold levels of confidence, then the machine learning component 701 may be retrained, for example, to adjust feature weights. The security policies may be redetermined using the retained machine learning component 701, and/or using updated information, such as, updated or newer parameters regarding the device, the application, the network, and/or the contextual parameters, which may be renormalized, and updated embedding vectors may be recomputed.

Once the levels of confidence satisfy the one or more threshold levels of confidence, the computing component 111 may output the determined aspects of the security policy to the device 150 or a user associated with the device 150, and/or automatically implement the determined aspects of the security policy.

Figure 8:
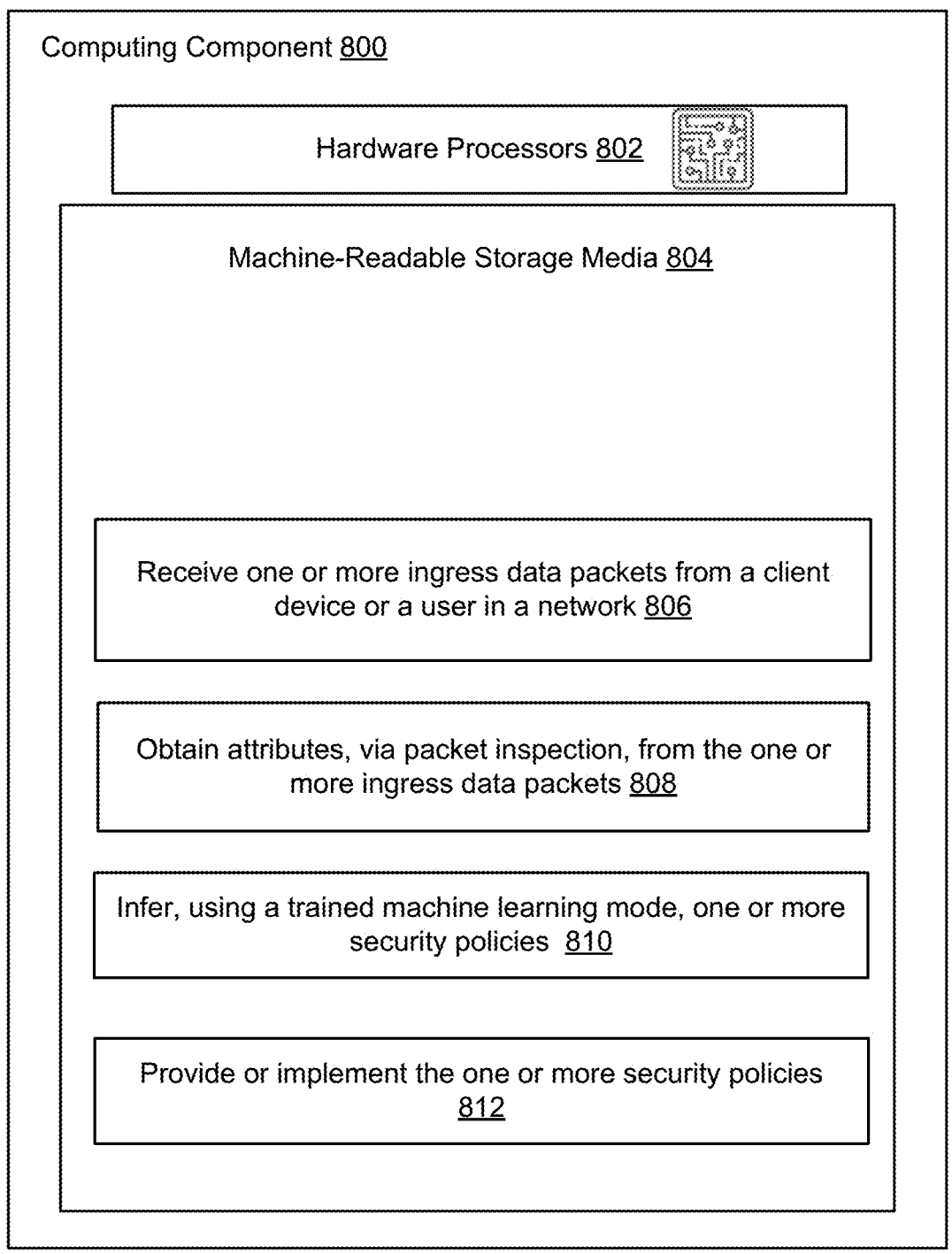
FIG. 8 is an example of a non-transitory computer readable storage medium depicting steps of dynamically implementing security policies based on an individual session and current network conditions, according to examples described in the present disclosure.

FIG. 8 illustrates a computing component 800 that includes one or more hardware processors 802 and machine-readable storage media 804 storing a set of machine-readable/machine-executable instructions that, when executed, cause the hardware processor(s) 802 to determine, implement, and/or enforce security policies depending on particular parameters or attributes of a client device or user, a destination from which data is sought by the client device or user, a network in which the client device or user is situated, and other contextual parameters or attributes. In such a manner. The hardware processor(s) 802 may implement a specific security policy dynamically based on changing network conditions, and/or tailored to each session. In order to balance security and access considerations. Such techniques represent an improvement over existing techniques which may implement a blanket, constant policy over different sessions and/or different networks. It should be appreciated that there can be additional, fewer, or alternative steps performed in similar or alternative orders, or in parallel, within the scope of the various embodiments discussed herein unless otherwise stated. In some examples, the computing component 800 may be implemented as the computing component 111 of FIGS. 1, 2, 3, 4, 5, 6, and/or 7. The computing component 800 may include a server.

The hardware processor(s) 802 may execute instruction 806 to receive one or more ingress data packets (e.g., the ingress data packet 152 of FIG. 1) from a client device (e.g., the client device 150) or a user (e.g., the user 250) in a network (e.g., the network 100). The hardware processor(s) 802 may execute instruction 808 to obtain attributes, via packet inspection, from the one or more ingress data packets. For example, the hardware processor(s) 802 may obtain a source address (e.g., the source address 176) indicating an IP address or other identifying address of the client device or the user, a destination address (e.g., the destination address 180) indicating an IP address or other identifying address of a destination from which the client device or the user is seeking data, within a header (e.g., the header 153) of the ingress data packet. Additionally, the hardware processor(s) 802 may obtain some of the attributes, such as information regarding the network from other sources such as network telemetry.

In some examples, the hardware processor(s) 802 may determine one or more embedding vectors from the attributes, wherein the one or more embedding vectors represent a status of a session during which the ingress data packets are obtained, as described with respect to FIGS. 3, 4, 5, and 6. In some examples, the embedding vectors may be implemented as any one or more of embedding vectors 304, 404, 504, and/or 604. The embedding vectors may represent information regarding the client device 150 or the user 250, information regarding a destination from which data or content is requested by the client device 150 or the user 250, and/or information regarding the network 100, in numerical form with reduced dimension and within a continuous relation space. The embedding vectors may indicate or numerically represent particular security attributes from the aforementioned information, such as, a degree or level of susceptibility to security threats such as intrusion, malware, viruses, data loss, and/or other attacks that compromise security. For example, within a particular session, from the aforementioned information, the embedding vectors 304, 404, 504, and/or 604 may indicate whether the session has a high level of susceptibility to security threats overall, or to a particular aspect of a security threat such as intrusion, data loss, malware, or viruses. The hardware processor(s) 802 may transmit the one or more embedding vectors as inputs to a trained machine learning model.

Figure 7:
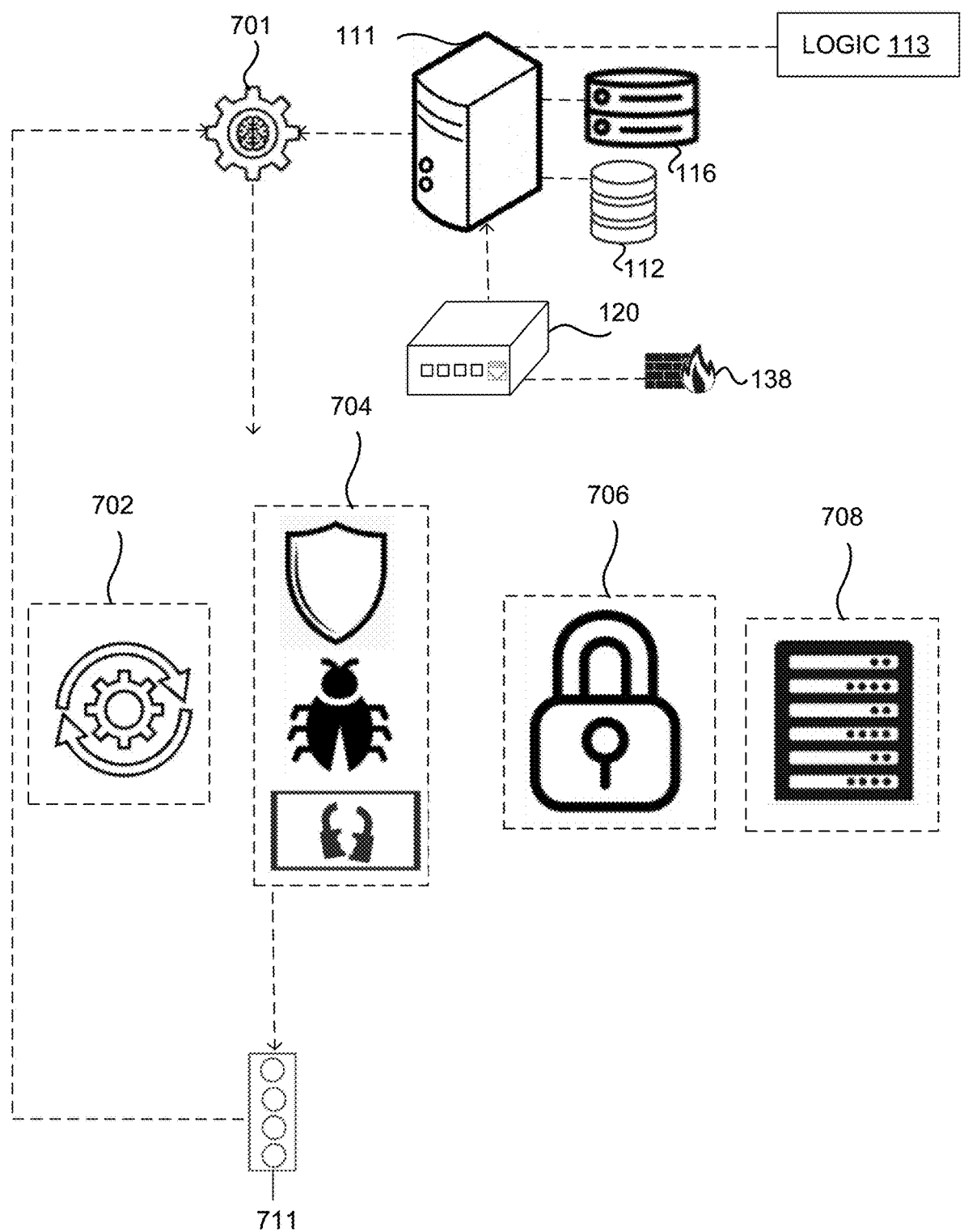
FIG. 7 is an example of a computing system that implements one or more security policies using the embedding vectors generated from FIGS. 3, 4, 5, and 6, or from the ingress data packets, according to examples described in the present disclosure.

The hardware processor(s) 802 may execute instruction 810 to infer, using the trained machine learning model, one or more security policies based on the embedding vectors or based on the attributes, as illustrated in FIG. 7. The one or more security policies may include an operating system aspect, a networking aspect, a cryptographic aspect, and an application aspect. The hardware processor(s) 802 may execute instruction 812 to provide, implement, or enforce the one or more security policies. For example, the hardware processor(s) 802 may output the one or more security policies and/or automatically change, reset, or set security settings or configurations consistent with the inferred one or more security policies.

Figure 9:
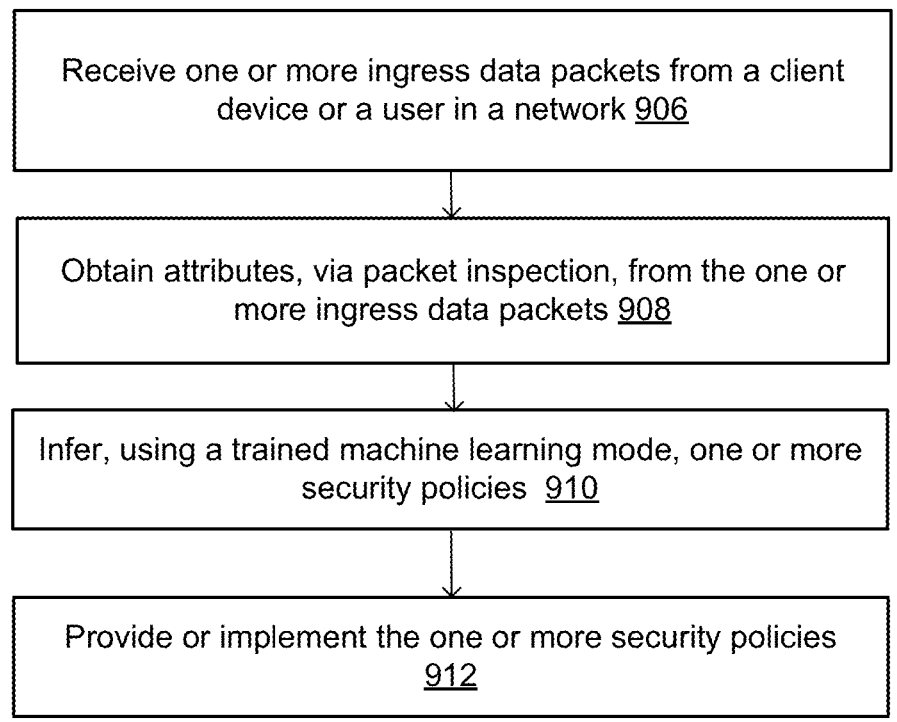
FIG. 9 is an example flowchart depicting a method of dynamically implementing security policies based on an individual session and current network conditions, according to examples described in the present disclosure.

FIG. 9 is an example flowchart depicting a method of dynamically implementing security policies based on an individual session and current network conditions, according to examples described in the present disclosure. In some examples, steps 906, 908, 910, and 912 may be implemented same or similar as, or analogous to, instructions 806, 808, 810, and 812 of FIG. 8, respectively.

In general, the word "component," "system," "component," "database," "data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that may be installed, decompressed or decrypted prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors. The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as a storage device. Volatile media includes dynamic memory, such as a main memory. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise a bus. Transmission media can also take the form of acoustic or light waves, such as those generated during radio-wave and infra-red data communications.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through a communication interface coupled to a bus. The communication interface may carry the digital data to and from a computer system such as the computing component 111.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as the computing component 111.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

Unless the context requires otherwise, throughout the present specification and claims, the word "comprise" and variations thereof, such as, "comprises" and "comprising" are to be construed in an open, inclusive sense, that is as "including, but not limited to." Recitation of numeric ranges of values throughout the specification is intended to serve as a shorthand notation of referring individually to each separate value falling within the range inclusive of the values defining the range, and each separate value is incorporated in the specification as it were individually recited herein. Additionally, the singular forms "a," "an" and "the" include plural referents unless the context clearly dictates otherwise. The phrases "at least one of," "at least one selected from the group of," or "at least one selected from the group consisting of," and the like are to be interpreted in the disjunctive (e.g., not to be interpreted as at least one of A and at least one of B).

What is claimed is:

1. A computer-implemented method, comprising:
   receiving one or more ingress data packets from a client device or a user in a network;
   obtaining attributes, via packet inspection, from the one or more ingress data packets;
   determining one or more embedding vectors from the attributes, wherein the one or more embedding vectors represent a status of a session during which the ingress data packets are obtained;
   transmitting the one or more embedding vectors as inputs to a trained machine learning model, wherein the machine learning model is trained using a first training dataset that indicates respective mappings of embedding vectors to security policies and a second training dataset generated based on incorrectly determined or incorrectly mapped security policies by the machine learning model; and
   inferring, using the trained machine learning model, one or more security policies based on the embedding vectors; and
   providing or implementing the one or more security policies.

2. The computer-implemented method of claim 1, wherein the security policies comprise an operating system aspect, a networking aspect, a cryptographic aspect, and an application aspect.

3. The computer-implemented method of claim 2, wherein the networking aspect is associated with intrusion detection, anti-malware, anti-virus protection, data loss prevention and a firewall.

4. The computer-implemented method of claim 2, wherein the cryptographic aspects comprise tunneling parameters or attributes.

5. The computer-implemented method of claim 2, wherein the application aspects comprise access control or log auditing attributes or parameters.

6. The computer-implemented method of claim 1, wherein the determination of the one or more vectors comprises generating:
   a first embedding vector corresponding to attributes associated with the client device or the user;
   a second embedding vector corresponding to attributes associated with destination from which data is sought;
   a third embedding vector corresponding to attributes associated with the network; and
   a fourth embedding vector corresponding to attributes associated with the contextual parameters.

7. The computer-implemented method of claim 6, wherein the attributes associated with the client device or the user comprise at least two of:
   a location of the client device or the user;
   bandwidth consumptions of different categories of content or applications by the client device or the user;
   a reputation based on content accessed by the client device or the user; and
   a frequency or number of security events triggered by the client device or the user.

8. The computer-implemented method of claim 6, wherein the attributes associated with the destination comprise at least two of:
   a deployment of the destination;
   a transmission medium or protocol of the destination;
   a reputation of the destination based on historical security attributes, parameters, or events;
   an abnormality metric of the destination; and
   a software stack or software embedding of the destination.

9. The computer-implemented method of claim 6, wherein the attributes associated with the network comprise at least two of:
- a network type;
- health parameters of the network;
- a distribution of priority traffic flows throughout the network;
- a geolocation over which the network is distributed; and
- one or more tags within the network.

10. A non-transitory storage medium storing instructions that, when executed by at least one processor of a computing system, cause the computing system to:
- receive one or more ingress data packets from a client device or a user in a network;
- obtain attributes, via packet inspection, from the one or more ingress data packets;
- determine one or more embedding vectors from the attributes, wherein the one or more embedding vectors represent a status of a session during which the ingress data packets are obtained;
- transmit the one or more embedding vectors as inputs to a trained machine learning model, wherein the machine learning model is trained using a first training dataset that indicates respective mappings of embedding vectors to security policies and a second training dataset generated based on incorrectly determined or incorrectly mapped security policies by the machine learning model; and
- infer, using the trained machine learning model, one or more security policies based on the embedding vectors, wherein the security policies comprise an operating system aspect, a networking aspect, a cryptographic aspect, and an application aspect; and
- providing or implementing the one or more security policies.

11. The non-transitory storage medium of claim 10, wherein the security policies comprise an operating system aspect, a networking aspect, a cryptographic aspect, and an application aspect.

12. The non-transitory storage medium of claim 11, wherein the networking aspect comprises attributes or parameters associated with intrusion detection, anti-malware, anti-virus protection, data loss prevention and a firewall.

13. The non-transitory storage medium of claim 10, wherein the determination of the one or more vectors comprises generating:
- a first embedding vector corresponding to attributes associated with the client device or the user;
- a second embedding vector corresponding to attributes associated with destination from which data is sought;
- a third embedding vector corresponding to attributes associated with the network; and
- a fourth embedding vector corresponding to attributes associated with the contextual parameters.

14. A computer-implemented method, comprising:
- receiving one or more ingress data packets from a client device or a user in a network;
- obtaining attributes, via packet inspection, from the one or more ingress data packets;
- determining one or more embedding vectors from the attributes, wherein the determination of the one or more vectors comprises generating
- a first embedding vector corresponding to attributes associated with the client device or the user,
- a second embedding vector corresponding to attributes associated with destination from which data is sought,
- a third embedding vector corresponding to attributes associated with the network, and
- a fourth embedding vector corresponding to attributes associated with the contextual parameters,
- and wherein the one or more embedding vectors represent a status of a session during which the ingress data packets are obtained;
- transmitting the one or more embedding vectors as inputs to a trained machine learning model; and
- inferring, using the trained machine learning model, one or more security policies based on the embedding vectors; and
- providing or implementing the one or more security policies.

* * * * *